(12) United States Patent
Zhao et al.

(10) Patent No.: US 8,716,393 B2
(45) Date of Patent: May 6, 2014

(54) FUNCTIONALIZED POLYSULFIDE SILICA COUPLING AGENTS AND SILICA REINFORCED RUBBER COMPOSITION FOR TIRE COMPONENTS

(75) Inventors: Junling Zhao, Hudson, OH (US); Michael Joseph Rachita, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 176 days.

(21) Appl. No.: 13/176,795

(22) Filed: Jul. 6, 2011

(65) Prior Publication Data
US 2012/0053300 A1    Mar. 1, 2012

Related U.S. Application Data

(60) Provisional application No. 61/376,704, filed on Aug. 25, 2010.

(51) Int. Cl.
*B60C 1/00*     (2006.01)
*C08L 9/00*     (2006.01)

(52) U.S. Cl.
USPC ........................................ 524/571

(58) Field of Classification Search
USPC ............... 524/571; 525/351; 568/22; 564/82; 546/316; 548/166
See application file for complete search history.

(56) References Cited

U.S. PATENT DOCUMENTS

| | | | |
|---|---|---|---|
| 5,610,216 A | 3/1997 | Sandstrom et al. | 524/381 |
| 5,641,820 A * | 6/1997 | Wideman et al. | 524/225 |
| 5,981,633 A | 11/1999 | Sandstrom et al. | 524/80 |
| 6,136,919 A * | 10/2000 | Zimmer et al. | 524/856 |
| 6,555,609 B1 | 4/2003 | Wideman et al. | 524/424 |
| 2007/0185267 A1 | 8/2007 | Kobayashi et al. | 525/191 |

FOREIGN PATENT DOCUMENTS

WO   2007/047943 A3   4/2007 ............... B60C 1/00

* cited by examiner

*Primary Examiner* — Ling Choi
*Assistant Examiner* — Catherine S Branch
(74) *Attorney, Agent, or Firm* — Henry C. Young, Jr.

(57) ABSTRACT

The invention relates to functionalized polysulfide silica coupling agents and silica reinforced rubber compositions. Such rubber composition may be used, for example, for tire components such as, for example, tire treads.

12 Claims, No Drawings

FUNCTIONALIZED POLYSULFIDE SILICA COUPLING AGENTS AND SILICA REINFORCED RUBBER COMPOSITION FOR TIRE COMPONENTS

The Applicants hereby claim the benefit of prior U.S. Provisional Application Ser. No. 61/376,704, filed Aug. 25, 2010.

FIELD OF INVENTION

The invention relates to functionalized polysulfide silica coupling agents and silica reinforced rubber compositions. Such rubber composition may be used, for example, for tire components such as, for example, tire treads.

BACKGROUND OF THE INVENTION

Various rubber tire components generally rely upon filler reinforcement to aid in achieving beneficial physical properties such as for example rubber reinforcing carbon black and synthetic amorphous silica, which may be in a form of precipitated silica, or a combination of rubber reinforcing carbon black and precipitated silica.

For this invention, it is desired to use a functionalized polysulfide coupling agent, without silane or siloxane moieties, for precipitated silica in a rubber composition which contains precipitated silica reinforcement, particularly for use as a tire component.

Historically, various non silane or non siloxane based silica coupling agents have been proposed such as, for example, poly-(2-propanol-1,3-polysulfide), U.S. Pat. No. 5,610,216; N,N'-dithiobis(organosulfonamide), U.S. Pat. No. 5,981,633; 3,3'-tetrathiodipropanol polysulfide, U.S. Pat. No. 5,733,693; nicotinamide, U.S. Pat. No. 5,504,137; 1-thioglycerol-(3-mercapto-1,2-propane diol), U.S. Pat. No. 6,555,609 and 2,2'-benzothioazyl disulfide, U.S. Pat. No. 6,555,609.

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art. The terms "cure" and "vulcanize" may also be used interchangeably unless otherwise noted.

SUMMARY AND DESCRIPTION OF THE INVENTION

In accordance with this invention, a functionalized polysulfide silica coupling agent is provided having a moiety reactive with a synthetic amorphous precipitated silica surface (e.g. with hydroxyl groups such as, for example silanol groups or oxygen moieties contained within the precipitated silica structure) and a polysulfide moiety interactive with conjugated diene-based elastomers, wherein said silica coupling agent is comprised of a functionalized polysulfide compound comprised of the general structural formula (I):

where R and $R^1$ are the same or different organyl groups; x is a value in a range of from 2 through 8, alternately from 2 through 4; and M and $M^1$ are the same or different functional groups, capable of reacting with the precipitated silica surface (e.g. with hydroxyl groups such as, for example silanol groups or oxygen moieties contained within the precipitated silica structure) on said precipitated silica;

wherein M and $M^1$ of said general formula (I) are the same or different and comprised of a heteroatom moiety comprised of a nitrogen heteroatom, sulfur heteroatom or oxygen heteroatom, provided that such heteroatom is reactive with said precipitated silica surface;

wherein said functionalized polysulfide compound is exclusive of poly-(2-propanol-1,3-polysulfide), N,N'-dithiobis(organosulfonamide), 3,3'-tetrathiodiipropanol polysulfide, nicotinamide, 1-thioglycerol-(3-mercapto-1,2-propane diol), and 2,2'-benzothioazyl disulfide.

In one embodiment, R and R' are the same or different and comprised of at least one of —$(CH_2)y$- and —$(CH_2$—O—$CH_2)z$-; y is a value in a range of from 1 through 12, alternately from 1 through 4; and z is a value in a range of from 1 through 4.

In one embodiment, for the said functionalized polysulfide silica coupling agent said heteroatom based moieties for said M and M' are comprised of:

(A) nitrogen heteroatom based moieties comprised of amine, imine, amide, imidizole and guanidine moieties reactive with the precipitated silica surface; or (B) sulfur heteroatom based moieties comprised of thiol, mercapto and xanthate moieties reactive with the precipitated silica surface, or (C) oxygen heteroatom based moieties comprised of ketone, aldehyde, carboxyl and epoxy moieties, preferably epoxy moieties, reactive with the precipitated silica surface;

wherein said functionalized polysulfide silica coupling agent is exclusive of poly-(2-propanol-1,3-polysulfide), N,N'-dithiobis(organo sulfonamide), 3,3'-tetrathiodiipropanol polysulfide, nicotinamide, 1-thioglycerol-(3-mercapto-1,2-propane diol), and 2,2'-benzothioazyl disulfide.

In a further embodiment, for the said functionalized polysulfide silica coupling agent, said heteroatom based moieties for said M and M' are comprised of:

(A) amine functional group reactive with hydroxyl groups on said precipitated silica, or (B) thiol functional group reactive with hydroxyl groups on said precipitated silica, or (C) an imine functional group reactive with hydroxyl groups on said precipitated silica, or (D) an epoxy group reactive with hydroxyl groups on said precipitated silica, or (E) a carboxyl group reactive with hydroxyl groups on said precipitate silica.

In additional embodiment, the said functionalized polysulfide silica coupling agent is comprised of the general structural formula (II):

where R and $R^1$ are the same or different organyl groups; x is a value in a range of from 2 through 4; and M and $M^1$ are epoxy groups.

In one embodiment, R and R' are the same or different and comprised of at least one of —$(CH_2)y$- and —$(CH_2$—O—$CH_2)z$-; y is a value in a range of from 1 through 4; and z is a value in a range of from 1 through 4.

In further accordance with this invention, a silica reinforced rubber composition is provided which comprises, based upon parts by weight per 100 parts by weight rubber (phr):

(A) sulfur curable diene-based elastomer(s) comprised of:
(1) at least one of non-functionalized elastomers comprised of at least one of isoprene and 1,3-butadiene and non-functionalized copolymers of styrene and at least one of isoprene and 1,3-butadiene, or (2) at least one functionalized diene-based elastomer is comprised of at least one of functionalized cis 1,4-polyisoprene elastomer (functionalized IR), functionalized cis 1,4-polybutadiene elastomer (functionalized BR) and functionalized styrene/butadiene copolymer elastomer (functionalized SBR), or (3) a combination of said non-functionalized elastomers and said functionalized elastomers, (e.g. from zero to 100 phr of each of said elastomers) and (B) from about 20 to about 120, alternately from about 30 to about 80, phr of rubber reinforcing filler as:

(1) amorphous synthetic precipitated silica (precipitated silica) or (2) combination of amorphous synthetic precipitated silica (precipitated silica) and rubber reinforcing carbon black comprised of greater than 50 weight percent of said precipitated silica; and (C) functionalized polysulfide silica coupling agent for said precipitated silica having a moiety reactive with the precipitated silica surface (e.g. with hydroxyl groups such as, for example silanol groups or oxygen moieties contained within the precipitated silica structure) and a polysulfide moiety interactive with said conjugated diene-based elastomers comprised of a functionalized polysulfide compound, wherein said silica coupling agent is comprised of the general structural formula (I):

(I)

where R and R$^1$ are the same or different organyl groups; x is a value in a range of from 2 through 8, alternately from 2 through 4; and M and M$^1$ are the same or different functional groups, capable of reacting with the precipitated silica surface (e.g. with hydroxyl groups such as, for example silanol groups or oxygen moieties contained within the precipitated silica structure) on said precipitated silica, and, optionally:

(1) silica coupling agent comprised of a bis(3-ethoxysilylpropyl) polysulfide containing an average of from about 2 to about 4 connecting sulfur atoms in its polysulfidic bridge, alternately in a range of from about 2 to about 2.6 or in a range of from about 3.4 to about 3.8, connecting sulfur atoms in its polysulfidic bridge, or (2) silica coupling agent comprised of organoalkoxymercaptosilane;

wherein M and M$^1$ of said general formula (I) are the same or different and comprised of a heteroatom moiety comprised of a nitrogen heteroatom, sulfur heteroatom or oxygen heteroatom, provided that such heteroatom is reactive with said precipitated silica surface;

wherein said functionalized diene-based elastomer contains functional group(s) comprised of:

(3) amine functional group reactive with hydroxyl groups on said precipitated silica, or (4) siloxy functional group reactive with hydroxyl groups on said precipitated silica, or (5) combination of amine and siloxy functional groups reactive with hydroxyl groups on said precipitated silica, or (6) combination of thiol and siloxy functional groups reactive with hydroxyl groups on said precipitated silica, or (7) combination of imine and siloxy functional groups reactive with hydroxyl groups on said precipitated silica, or (8) hydroxyl functional groups reactive with said precipitated silica, or (9) epoxy groups reactive with hydroxyl groups on said precipitated silica, or

(10) carboxyl groups reactive with hydroxyl groups on said precipitated silica.

In one embodiment, R and R' are the same or different and comprised of at least one of —(CH$_2$)y- and —(CH$_2$—O—CH$_2$)z-; y is a value in a range of from 1 through 12, alternately from 1 through 4; and z is a value in a range of from 1 through 4.

Representative examples of said heteroatom moieties for said M and M' are, for example:

(A) nitrogen heteroatom based moieties comprised of amine, imine, amide, imidizole and guanidine moieties reactive with the precipitated silica surface;

(B) sulfur heteroatom based moieties comprised of thiol, mercapto and xanthate moieties reactive with the precipitated silica surface;

(C) oxygen heteroatom based moieties comprised of ketone, aldehyde, carboxyl and epoxy moieties, preferably an epoxy moiety, reactive with the precipitated silica surface;

wherein said functionalized polysulfide materials are exclusive of poly-(2-propanol-1,3-polysulfide), N,N'-dithiobis(organosulfonamide), 3,3'-tetrathiodiipropanol polysulfide, nicotinamide, 1-thioglycerol-(3-mercapto-1,2-propane diol), and 2,2'-benzothioazyl disulfide.

Exemplary of various heteroatom based moieties for said M and M' are, for example:

(A) amine functional group reactive with hydroxyl groups on said precipitated silica, or (B) thiol functional group reactive with hydroxyl groups on said precipitated silica, or (C) an imine functional group reactive with hydroxyl groups on said precipitated silica, or (D) an epoxy group reactive with hydroxyl groups on said precipitated silica, or (E) a carboxyl group reactive with hydroxyl groups on said precipitated silica.

Exemplary of said a functionalized polysulfide compound for use as a coupler, or coupling agent, for said precipitated silica is comprised of the general structural formula (II):

$$M\text{-}R\text{—}S_x\text{—}R^1\text{-}M^1 \qquad (II)$$

where R and R$^1$ are the same or different organyl groups; x is a value in a range of from 2 through 4; and M and M$^1$ are epoxy groups.

In one embodiment, R and R' are the same or different and comprised of at least one of —(CH$_2$)y- and —(CH$_2$—O—CH$_2$)z-; y is a value in a range of from 1 through 4; and z is a value in a range of from 1 through 4.

For the functionalized elastomers, representative of amine functionalized SBR elastomers are, for example, in-chain functionalized SBR elastomers mentioned in U.S. Pat. No. 6,936,669.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Patent Application Publication No. 2007/0185267.

Styrene/butadiene elastomers end functionalized with a silane-sulfide group are mentioned in WO 2007/047943 patent publication.

Representative of hydroxy functionalized SBR elastomers is, for example, Tufdene 3330™ from Asahi.

Representative of epoxy functionalized SBR elastomers is, for example, Tufdene E50™ from Asahi. A significant aspect of this invention is providing a non silane and non siloxane containing silica coupler for precipitated silica and use thereof which can provide an alternate silica bonding capability, particularly where M and M' are comprised of epoxy groups.

In additional accordance with this invention, a rubber composition prepared by such method is provided.

In further accordance with this invention, a tire is provided having a component comprised of said rubber composition such as, for example, a tire tread.

The rubber composition of the present invention may contain conventional amounts of known rubber chemicals.

Typical amounts of tackifier resins, if used, may comprise about 0.5 to about 10 phr, usually about 1 to about 5 phr. Typical amounts of plasticizers comprise about 1 to about 50 phr. Such plasticizers can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5 being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 0.5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention, unless otherwise indicated.

The rubber composition may be and is preferably prepared by mixing the diene-based rubber, carbon blacks and other rubber compounding ingredients, exclusive of the rubber curatives, in at least one sequential mixing step with at least one mechanical mixer, usually referred to as "non-productive" mix stage(s), to a temperature in a range of, for example, about 140° C. to about 180° C. for one to about 4 minutes, followed by a final mix stage in which the curatives, such as sulfur and accelerators, are added and mixed therewith for about 1 to about 4 minutes to a temperature within a range of, for example, about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

Vulcanization of the rubber composition of the present invention is generally carried out at conventional temperatures ranging from, for example, about 130° C. to about 200° C. Preferably, the vulcanization is conducted at temperatures ranging from, for example, about 140° C. to about 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a rubber component for a pneumatic tire which is the subject of this invention. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. A silica reinforced rubber composition which comprises, based upon parts by weight per 100 parts by weight rubber (phr):
   (A) sulfur curable diene-based elastomer(s) comprised of:
     (1) at least one non-functionalized polymers comprised of at least one of isoprene and 1,3-butadiene and non-functionalized copolymers of styrene and at least one of isoprene and 1,3-butadiene, and
     (2) at least one functionalized diene-based elastomer comprised of at least one of functionalized cis 1,4-polyisoprene elastomer (functionalized IR), functionalized cis 1,4-polybutadiene elastomer (functionalized BR) and functionalized styrene/butadiene copolymer elastomer (functionalized SBR), and
   (B) from about 20 to about 120 phr of rubber reinforcing filler as:
     (1) amorphous synthetic precipitated silica (precipitated silica) or
     (2) combination of amorphous synthetic precipitated silica and rubber reinforcing carbon black; and
   (C) polysulfide sulfur silica coupler for said precipitated silica having a moiety reactive with hydroxyl groups on the precipitated silica surface and a polysulfide moiety interactive with said conjugated diene-based elastomers comprised of the general structural formula (I):

$$M\text{-}R\text{—}S_x\text{—}R^1\text{-}M^1 \quad (I)$$

where R and $R^1$ are the same or different organyl groups; x is a value in a range of from 2 through 8; and M and $M^1$ are the same or different functional groups, capable of reacting with the precipitated silica surface, and, also optionally:

(1) silica coupling agent comprised of a bis(3-ethoxysilylpropyl)polysulfide containing an average of from about 2 to about 4 connecting sulfur atoms in its polysulfidic bridge, alternately in a range of from about 2 to about 2.6 or in a range of from about 3.4 to about 3.8, connecting sulfur atoms in its polysulfidic bridge, or (2) silica coupling agent comprised of an organoalkoxymercaptosilane;

wherein M and $M^1$ of said general formula (I) are the same or different and comprised of a heteroatom moiety comprised of a nitrogen heteroatom, sulfur heteroatom or oxygen heteroatom, provided that such heteroatom is reactive with said precipitated silica surface;

wherein said functionalized diene-based elastomer contains functional group(s) comprised of:

(3) amine functional group reactive with hydroxyl groups on said precipitated silica, or (4) siloxy functional group reactive with hydroxyl groups on said precipitated silica, or (5) combination of amine and siloxy functional groups reactive with hydroxyl groups on said precipitated silica, or (6) combination of thiol and siloxy functional groups reactive with hydroxyl groups on said precipitated silica, or (7) combination of imine and siloxy functional groups reactive with hydroxyl groups on said precipitated silica, or (8) hydroxyl functional groups reactive with said precipitated silica, or (9) carboxyl groups reactive with hydroxyl groups on said precipitated silica wherein said heteroatom moieties for said M and M' are comprised of at least one of:

(10) nitrogen heteroatom based moieties comprised of amine, imine, amide, imidizole and guanidine moieties reactive with the precipitated silica surface;

(11) sulfur heteroatom based moieties comprised of thiol, mercapto and xanthate moieties reactive with the precipitated silica surface, and

(12) oxygen heteroatom based moieties comprised of ketone, aldehyde, carboxyl and epoxy moieties reactive with the precipitated silica surface, and wherein said polysulfide sulfur silica coupler is exclusive of poly-(2-propanol-1,3-polysulfide), N,N'-dithiobis(organosulfonamide), 3,3'-tetrathiodipropanol polysulfide, nicotinamide, 1-thioglycerol-(3-mercapto-1,2-propane diol), and 2,2'-benzothioazyl disulfide.

2. The rubber composition of claim 1 wherein R and R' are the same or different and comprised of at least one of —$(CH_2)$y- and —$(CH_2$—O—$CH_2)$z-; y is a value in a range of from 1 through 12; and z is a value in a range of from 1 through 4.

3. The rubber composition of claim 1 wherein said heteroatom based moieties for said M and M' are composed of:

(A) amine functional group reactive with hydroxyl groups on said precipitated silica, or (B) thiol functional group reactive with hydroxyl groups on said precipitated silica, or (C) imine functional group reactive with hydroxyl groups on said precipitated silica, or (D) carboxyl group reactive with hydroxyl groups on said precipitated silica.

4. The rubber composition of claim 1 wherein said functionalized polysulfide compound is comprised of the general structural formula (II):

$$M\text{-}R\text{—}S_x\text{—}R^1\text{-}M^1 \quad (II)$$

where R and $R^1$ are the same or different organyl groups; x is a value in a range of from 2 through 4; and M and $M^1$ are epoxy groups.

5. The rubber composition of claim 4 wherein R and R' are the same or different and comprised of at least one of —$(CH_2)$y- and —$(CH_2$—O—$CH_2)$z-; y is a value in a range of from 1 through 12; and z is a value in a range of from 1 through 4.

6. A tire having a component comprised of the rubber composition of claim 1.

7. A tire having a component comprised of the rubber composition of claim 2.

8. A tire having a component comprised of the rubber composition of claim 3.

9. A tire having a component comprised of the rubber composition of claim 4.

10. A tire having a tread comprised of the rubber composition of claim 1.

11. A tire having a tread comprised of the rubber composition of claim 2.

12. A tire having a tread comprised of the rubber composition of claim 3.

* * * * *